(12) United States Patent
Horton et al.

(10) Patent No.: US 6,286,309 B1
(45) Date of Patent: *Sep. 11, 2001

(54) METHOD OF MAKING A HYDROSTATIC TRANSMISSION HAVING CONTROLLED FLUID PRESSURE

(75) Inventors: Todd Horton; Michael Bennett, both of Bethany, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/584,651

(22) Filed: May 31, 2000

Related U.S. Application Data

(63) Continuation of application No. 09/225,368, filed on Jan. 4, 1999, now Pat. No. 6,073,444, which is a continuation of application No. 08/658,364, filed on Jun. 5, 1996, now Pat. No. 5,855,116, which is a continuation of application No. 08/392,484, filed on Feb. 23, 1995, now Pat. No. 5,546,752.

(51) Int. Cl.⁷ .................................................... F16D 31/02
(52) U.S. Cl. ................................................................ 60/468
(58) Field of Search ........................ 60/468, 494; 91/441

(56) References Cited

U.S. PATENT DOCUMENTS

| | | | |
|---|---|---|---|
| 4,936,095 | * | 6/1990 | Ross et al. ............................. 60/468 |
| 5,412,948 | * | 5/1995 | Komura et al. ........................ 60/468 |
| 5,546,752 | * | 8/1996 | Horton et al. ......................... 60/468 |
| 5,855,116 | * | 1/1999 | Horton et al. ......................... 60/468 |
| 6,073,444 | * | 6/2000 | Horton et al. ......................... 60/468 |

FOREIGN PATENT DOCUMENTS

| | | | |
|---|---|---|---|
| 156521 | * | 9/1982 | (DE) ...................................... 60/468 |
| 2112910 | * | 7/1983 | (GB) ...................................... 60/468 |
| 125563 | * | 11/1978 | (JP) ....................................... 60/494 |

* cited by examiner

Primary Examiner—F. Daniel Lopez
(74) Attorney, Agent, or Firm—Thomas C. McDonough; John E. Hyatt

(57) ABSTRACT

Methods of controlling fluid pressure, including using a valve mechanism, are disclosed. In one embodiment, a valve mechanism for use in a hydrostatic transmission including a closed porting system for hydraulic fluid and a sump is provided. The valve mechanism includes a valve body mounted to the hydrostatic transmission whereby the valve body is open to the closed porting system at one end thereof and open to the sump at the other end thereof. The valve body has a first open position whereby hydraulic fluid is pulled into the closed system from the sump when the pressure of the fluid in the closed system is below a first pressure, a second open position whereby hydraulic fluid exists the closed system to the sump when the pressure of the fluid is at a second pressure higher than the first pressure, and a closed position when the pressure of the hydraulic fluid in the closed system is at a third pressure higher than the second pressure.

4 Claims, 10 Drawing Sheets

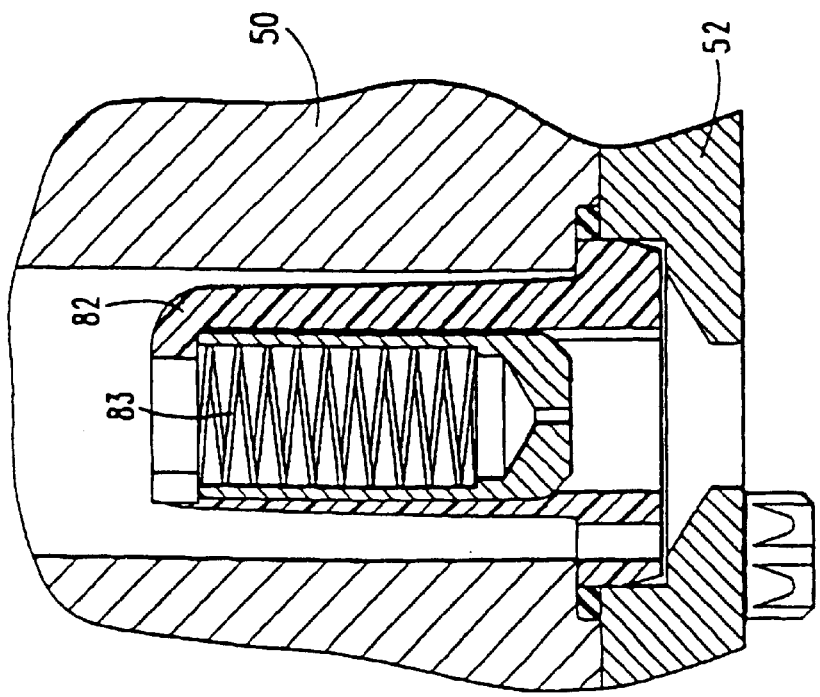
*FIG. 8*   *PRIOR ART*
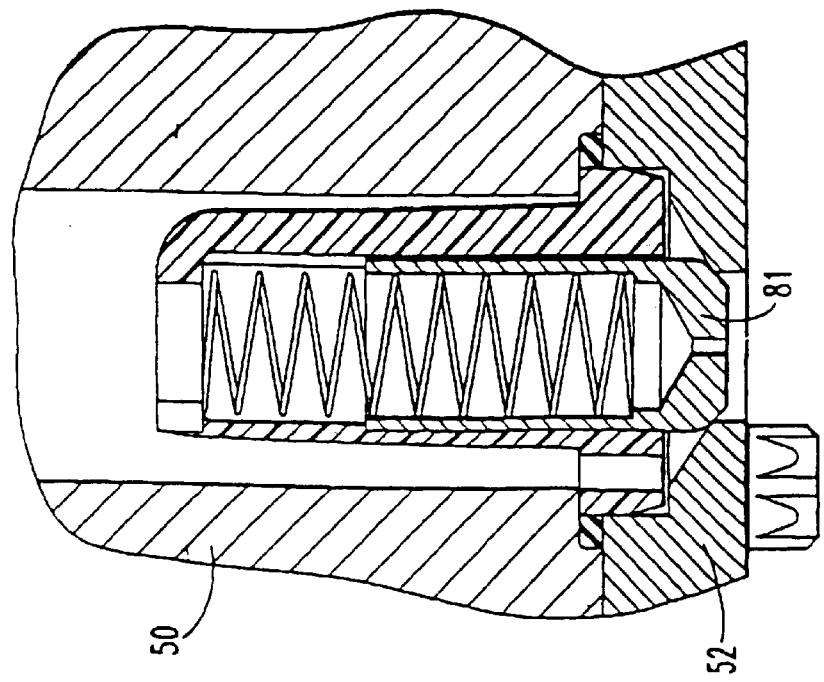
*FIG. 7*   *PRIOR ART* ated as U.S. Pat. No.
METHOD OF MAKING A HYDROSTATIC TRANSMISSION HAVING CONTROLLED FLUID PRESSURE

CROSS REFERENCE TO RELATED APPLICATIONS

This application is a continuation of U.S. App. Ser. No. 09/225,368, filed Jan. 4, 1999 issued as U.S. Pat. No. 6,073,444; which is a continuation of U.S. App. Ser. No. 08/658,364, filed Jun. 5, 1996, issued as U.S. Pat. No. 5,855,116, which is a continuation of U.S. App. Ser. No. 08/392,484, filed Feb. 23, 1995, issued as U.S. Pat. No. 5,546,752, and claims benefit of an earlier filing date under 35 U.S.C. 120.

BACKGROUND OF THE INVENTION

The disclosure of U.S. Pat. App. Ser. No. 09/225,368 is incorporated herein by reference.

This invention relates generally to hydrostatic transmissions ("HST") commonly used with riding lawn mowers and similar small tractors. Such tractors generally use an engine having a vertical output shaft which is connected to a transaxle via a conventional belt and pulley system. Other designs use horizontal output shafts or direct shaft drive to the transaxle. The HST may be connected to an axle driving apparatus or it may be integrally formed therewith in an integrated hydrostatic transaxle ("IHT"). The general structure and benefits of HSTs and IHTs are discussed in U.S. Pat. No. 5,201,692, to Johnson and Hauser issued Apr. 13, 1993, the text of which is herein incorporated by reference.

A standard HST for a transaxle includes a hydraulic pump which is driven by the engine output shaft, and a hydraulic motor, both of which are preferably mounted on a center section containing porting to hydraulically connect the pump and motor. Rotation of the pump by an input shaft creates an axial motion of the pump pistons through use of the swash plate. The oil pressure created by this axial motion is channelled via porting to the hydraulic motor, where it is received by the motor pistons, and the axial motion of these pistons against a thrust bearing causes the motor to rotate. The hydraulic motor in turn has an output shaft which drives the vehicle axles through differential gearing.

As described, the hydraulic system has two pressure zones, the high pressure side which includes that portion of the circuit handling the movement of the fluid from the pump to the motor, and the low pressure side which includes the remainder of the circuit wherein fluid from the motor is returned to the pump. When the tractor is in reverse, the high and low pressure sides of the system are switched. It is generally understood in such designs that the pump requires more oil than is returned from the motor due to leakage from the hydraulic system into the sump. This requirement of oil is satisfied by using check valves on each side of the hydraulic system. The check valve consists of a means for preventing flow out of the system when under high pressure and a means for allowing flow into the system when under low pressure. Such check valves can be inserted directly into the center section or can be mounted in a separate check valve plate which is secured to the center section.

Furthermore, in the prior art, it is known to separately provide a mechanism for the relief of excess oil pressure (such as when neutral is desired) from the pressure side of the system. A first method of accomplishing this is by providing bleed orifices in the system from which oil will leak. However, these bleed orifices do not have the ability to close and it is seen that efficiency is lost as a result. A second method of accomplishing this is to provide a spring biased neutral valve that allows oil to pass, at a substantially constant rate, from the pressure side until a set pressure is reached, which overcomes the bias of the spring, whereby the valve will thereafter close.

While these valves work well for their intended purpose, it is seen that, among other things, these valve suffer the disadvantages of not providing smooth transition between closed and open positions and of having a rapid rate of closure whereby the neutral band is narrowed. Therefore, a need exists for an improved neutral valve.

As a result of this existing need, it is an object of the present invention to provide a combination neutral and check valve assembly. It is a further object to provide a neutral valve which has an increased neutral band. It is yet another object of the present invention to provide a neutral valve which incorporates a smooth transition between open and closed positions.

SUMMARY OF THE INVENTION

In accordance with the present invention, a valve mechanism for use in a hydrostatic transmission including a closed porting system for hydraulic fluid and a sump is provided. The valve mechanism includes a valve body mounted to the hydrostatic transmission whereby the valve body is open to the closed porting system at one end thereof and open to the sump at the other end thereof. The valve body has a first open position whereby hydraulic fluid is pulled into the closed system from the sump when the pressure of the fluid in the closed system is below a first pressure, a second open position whereby hydraulic fluid exits the closed system to the sump when the pressure of the fluid is at a second pressure higher than the first pressure, and a closed position when the pressure of the hydraulic fluid in the closed system is at a third pressure higher than the second pressure.

A better understanding of the objects, advantages, features, properties and relationships of the invention will be obtained from the following detailed description and accompanying drawings which set forth an illustrative embodiment and is indicative of the various ways in which the principles of the invention may be employed.

BRIEF DESCRIPTION OF THE DRAWINGS

In the attached drawings, described briefly below, generally only enough of the invention is illustrated to enable one of skill in the art to practice the invention without undue experimentation.

FIG. 7 is a prior art check valve using a popper and spring with the check valve in the closed position;

FIG. 8 is a prior art check valve as in FIG. 7 with the check valve in the open position;

DESCRIPTION OF EXEMPLARY EMBODIMENTS

Figure 1:
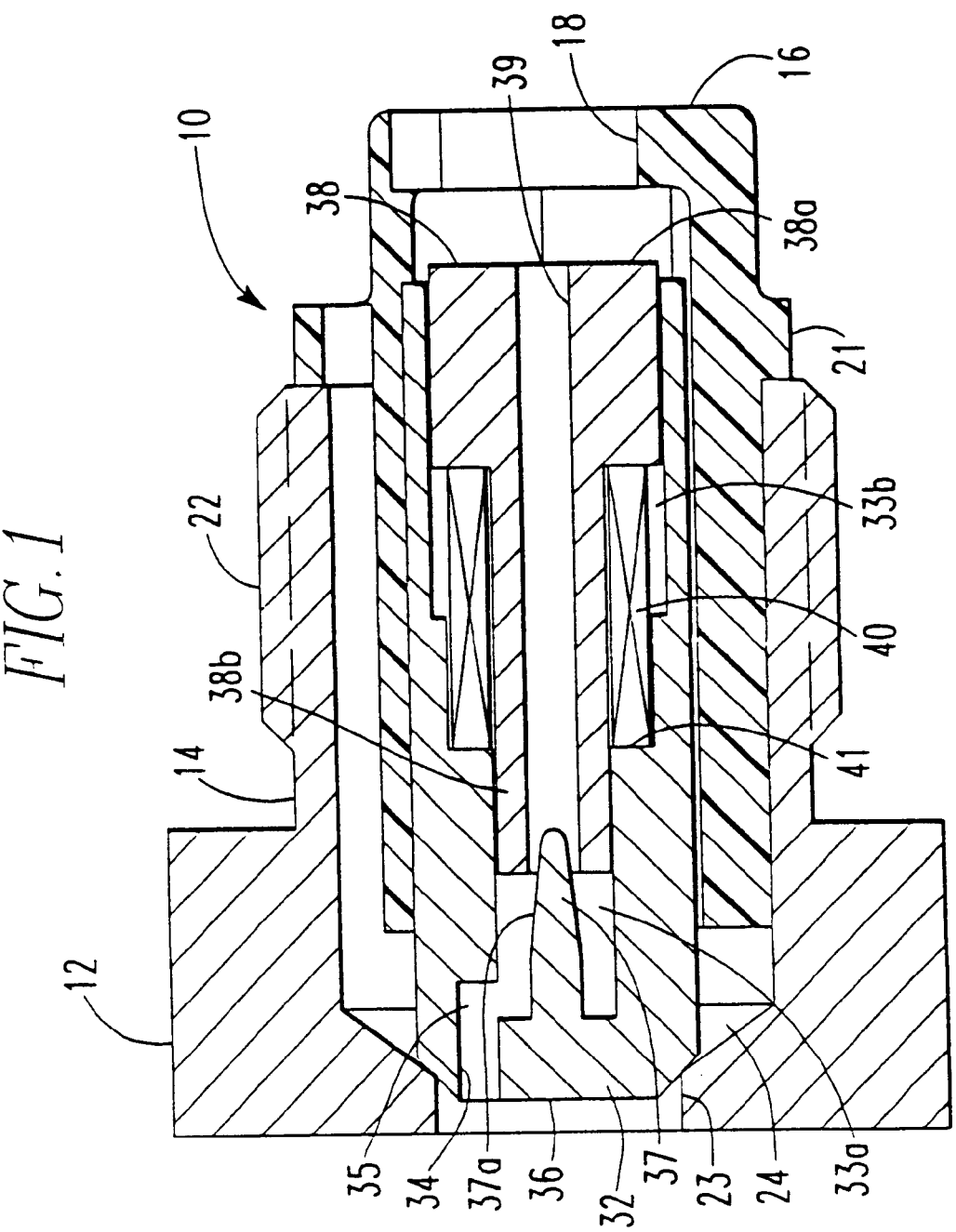
FIG. 1 is a cross-sectional view of a valve cartridge manufactured in accordance with this invention.

FIG. 1 shows a cross-sectional view of the valve 10 in accordance with a first embodiment of the present invention. Valve 10 comprises head 12 at one end thereof, which may be formed in a hexagonal shape as a nut for securing valve 10 to the HST center section, and valve body 14, which is generally cylindrical in shape. Valve body 14 is partially hollow and is open at a second end thereof Retainer 16 is generally cylindrical and is shaped to fit into the opening at the second end of valve body 14. In the preferred embodiment retainer 16 may be composed of plastic. Retainer 16 has a closed end with opening 18 formed therein and an open end. Retainer 16 may be held in place by the internal portion of valve body 14 by means of friction. It is to be understood that the retainer 16 may also be held in place by the center section 50. Flange 21 is formed on retainer 16 to rest against the second generally open end of valve body 14 to secure retainer 16 in place.

Opening 23 is formed at the first generally closed end of valve body 14 to allow oil flow to and from the internal position thereof A seat 24 is formed on the internal portion of valve body 14.

Check spool 32 and neutral spool 38 are formed to fit within retainer 16 and valve body 14. Check spool 32 is generally cylindrical and has an internal chamber 33 shown with at least two areas of different diameters, namely chambers 33a, 33b. It is understood that this design could use any number of sub-chambers of different internal diameters in internal chamber 33. The body of check spool 32 is generally closed at a first end 36, and includes opening 34 formed on the end 36 and communicating with internal channel 35 to allow oil flow between internal chamber 33 of check spool 32 and opening 23 of valve body 14. Closed end 36 of check spool 32 is shaped to fit against seat 24, although check spool 32 is movable within the internal chamber of retainer 16. The check spool 32 also includes a needle valve projection 37 having a generally arcuate surface 37a disposed into the passage 33 in the vicinity of channel 35. Generally, the needle valve projection 37 has a conical like shape having a smaller diameter near the top thereof than at the bottom thereof.

Neutral spool 38 has a generally cylindrical head 38a which has an external diameter sized such that head 38a slidably fits within internal chamber 33b. Neutral spool 38 also has a cylindrical arm 38b integrally formed with and extending from head 38a. Passage 39 is bored or otherwise formed in neutral spool 38 to allow the passage of oil therethrough. In a preferred embodiment, neutral spool 38 is composed of screw machined steel while check spool 33 may be manufactured using injection molding. Arm 38b has an outer diameter sized to slidably engage with the internal chamber 33a of check spool 32.

As shown in FIG. 1, neutral spool 38 and check spool 32 are in slidable engagement with one another. Spring 40 is mounted around arm 38b and contacts head 38a and spring seat 41 formed on check spool 32 to control the movement of neutral spool 38 into and out of check spool 32. Needle valve projection 37 is formed on the internal portion of check spool 32 to communicate with passage 39.

Valve body 14 as shown in the embodiment of FIG. 1 has threads 22 formed thereon. However, it is not required to use threads 22 to secure valve 10 in the HST center section in such an embodiment. Another possible method would be to press-fit the entire valve into the center section. Thus, the drain passages in valve 10 would be sealed from the hydraulic circuit by the interference fit between valve 10 and center section. In this embodiment the valve 10 could be formed out of powdered metal.

Valve 10 has several positions, including fully open wherein oil flow between the HST's center section and sump is substantially unobstructed, and fully closed, wherein there is no oil flow absent normal leakage through the structure. These various positions are shown in FIGS. 2–6, which show a second embodiment of this invention. The general relationship and operation of neutral spool 38 and check spool 32 are the same in either embodiment and identical elements have been given identical reference numerals in the figures.

Figure 2:
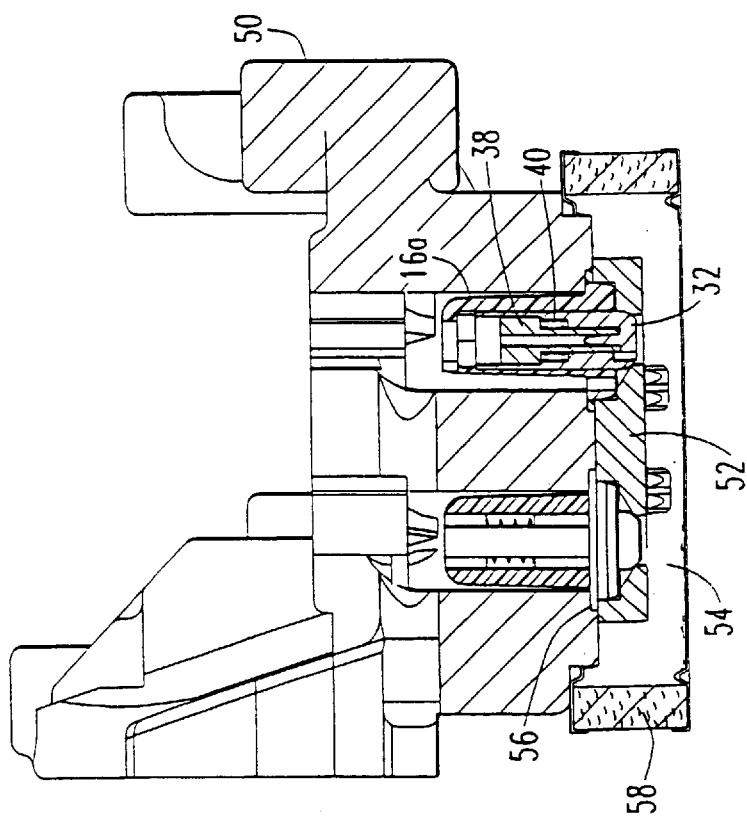
FIG. 2 is a partial cross-sectional view of an HST center section using a valve pursuant to a second embodiment of this invention, with the valve in the fully closed position.

FIG. 2 shows a second embodiment of valve 10 mounted in a center section. Rather than having a separate valve body as in FIG. 1, the embodiment in FIGS. 2–6 has a check valve plate 52 which is secured to a surface of center section 50 by a cap screw 54 or similar means. Ring 56, which may be a crush ring or sealing ring, functions to create a seal between this element and, if desired, a filter 58 maybe secured to center section 50 and/or check plate 52 to filter the hydraulic fluid before it enters center section 50. Retainer 16 is shaped differently and incorporates head 16a to secure it to the center section 50. This second embodiment is preferred due to lower manufacturing costs involved.

The following description of hydraulic fluid flow is generally given with respect to the second embodiment of this invention. It is understood that it applies as well to other embodiments shown and disclosed herein. When the hydraulic transmission is near the true neutral position, the small oil flow resulting therefrom flows from the center section to the sump through the neutral valve. As the transmission is moved out of neutral, this flow out of the center section is slowly reduced to zero as the neutral valve is closed. A key benefit of the present invention is that it allows for this flow reduction to be smooth and controlled, regardless of the speed at which the transmission is shifted out of neutral. This controlled cutoff is preferably accomplished through the use of spring 40 and/or dampener spaces built into the design.

Figure 3:
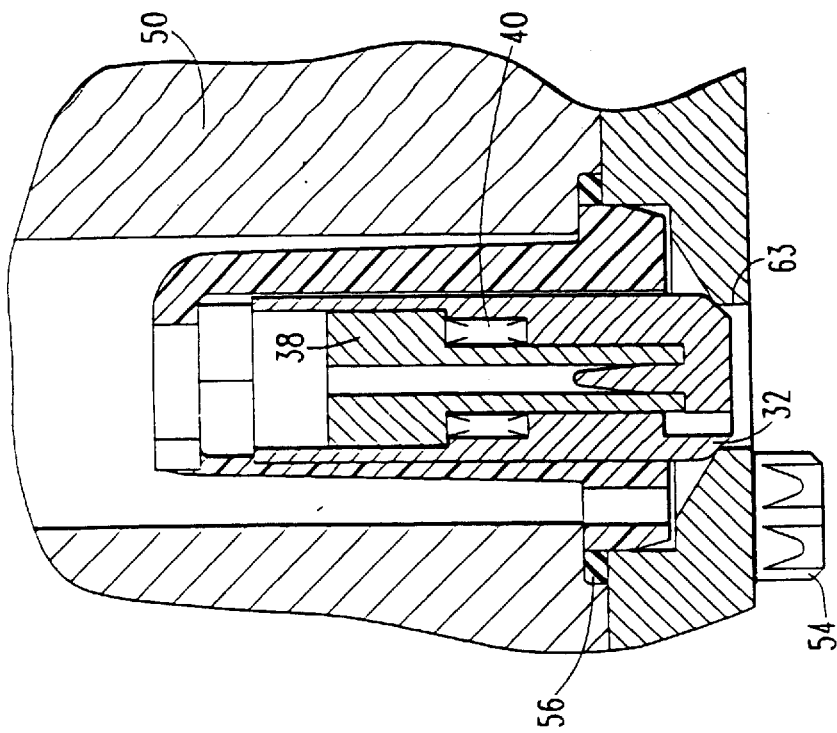
FIG. 3 is a partial cross-sectional side view of the hydrostatic transmission and valve shown in FIG. 2, with the check valve in the fully closed position and the neutral valve in the fully closed position.
Figure 4:
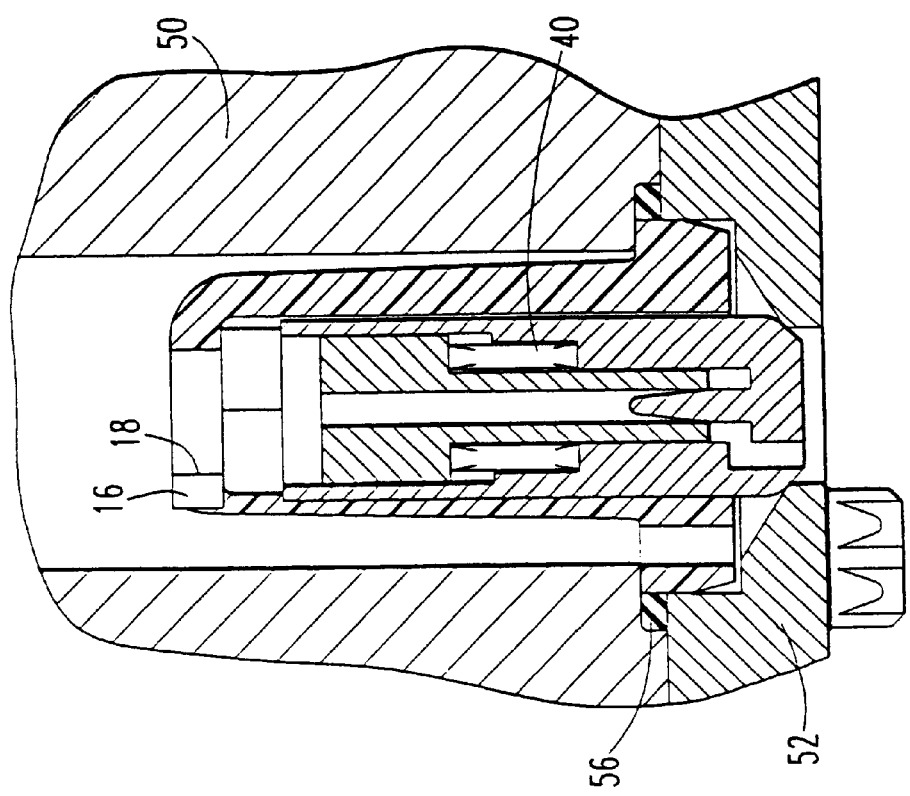
FIG. 4 is a partial cross-sectional view of the HST and valve shown in FIG. 2, with the check valve portion fully closed and the neutral valve portion partially open.
Figure 5:
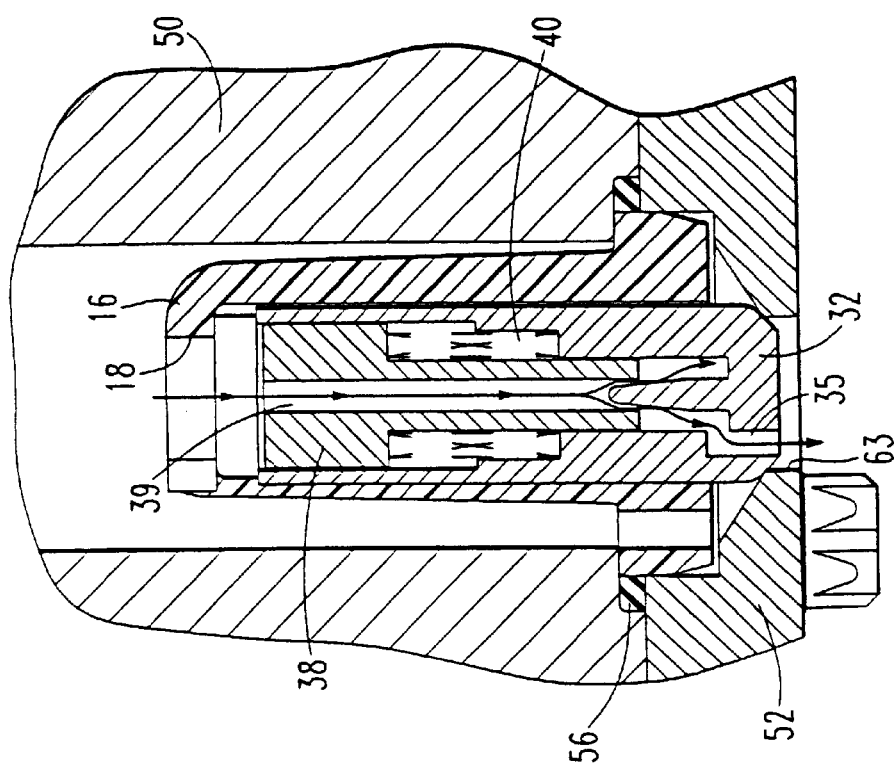
FIG. 5 is a partial cross-sectional view of the HST and valve shown in FIG. 2, with the check valve portion closed and the neutral valve portion in the fully open position.

FIGS. 1 and 5 shows valve 10 in the fully open neutral position where hydraulic fluid can flow out of center section 50 to the sump as shown by the arrows in FIG. 5. This fluid flows first through opening 18 in retainer 16 and it is ultimately discharged to the sump through opening 23 in valve body 14 or opening 63 in check plate 52. One of the paths the oil can take is through passage 39, through channel 35 and out opening 34 in check spool 32. As the oil pressure in the hydraulic circuit adjacent the valve increases, the oil pressure increases on neutral spool 38, and it is forced further into the internal section of check spool 32, compressing spring 40 as shown in FIG. 4 and acting against the fluid trapped in chamber 33b. Ultimately, when the oil pressure reaches a set level, as shown in FIG. 3, the distal end of arm 38b will obstruct passage 35 thus cutting off flow through passage 39. The pressure at which these changes occur can be varied by changing the tolerances of the various parts as well as the constant of spring 40 and/or the dimensions of chamber 33b.

As can be seen in FIG. 4, as the neutral spool moves towards the passage 35, oil flow through passage 39 will slowly diminish due to the interaction of the arcuate surface 37a of the needle valve projection 37 and the side walls of the internal passage 39 whereby the opening leading to the passage 35 will be caused to slowly decrease in size. In addition, it is seen that oil is permitted to flow between head 38a and internal chamber 33b of check spool 32 in which spring 40 is mounted. Oil accumulates in this chamber 33b and is forced out between arm 38b and internal chamber 33a of check spool 32 when the neutral spool moves to the closed position. Specifically, the rate of oil flow from the internal chamber will move from 0, before the neutral spool 38 moves, to a generally constant rate of dispersement which rate of dispersement is known to depend upon the viscosity of the fluid and the size of the opening between the check spool 32 and the neutral spool 38. Therefore, owing to the fluid trapped within the chamber 33b, a pressure is built therein which pressure acts against the pressure of the fluid acting upon the head 38a such that the rate of closure is slowed with the result being a smooth rate of closure. While the spring 40 may or may not be used to further control the rate of closure of the neutral spool 38, the spring 40 does function to bias the spool 38 towards the open position when pressure is removed from the head 38a. It will also be appreciated that, since the rate of flow into the chamber 33b is also substantially constant, the movement of the spool 38 to the open position will be controlled by the rate of flow of fluid into the chamber 33b. Specifically, the reverse pressure caused by the suction of fluid into the chamber 33b will act against the bias of the spring 40 whereby movement of the neutral spool 38 is controlled and the opening of the valve smoothed. As illustrated, the fluid in the chamber 33b acts to dampen the movement of the neutral spool 38 such that the valve will move at a rate slower than the rate of the pressure acting thereupon.

Figure 9:
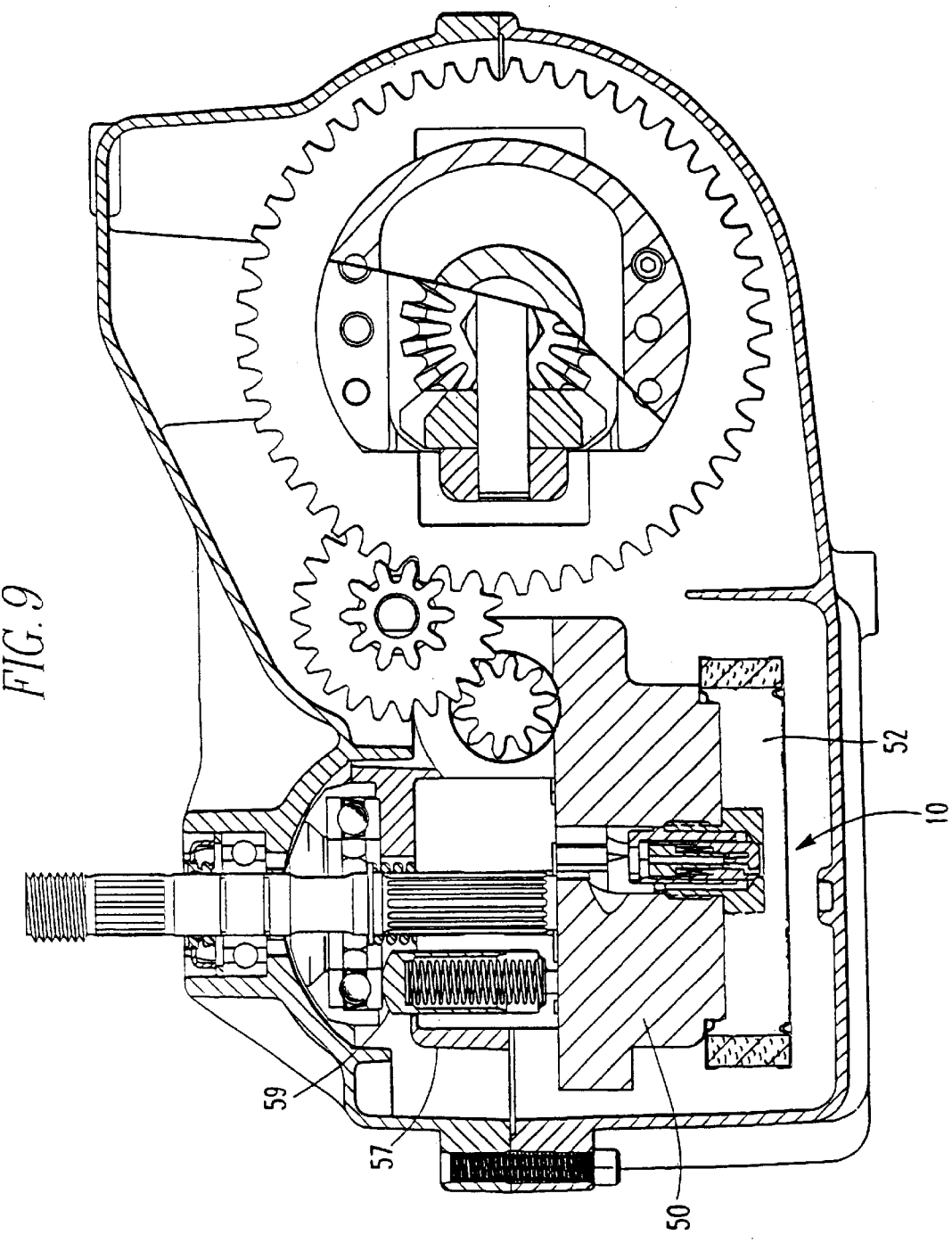
FIG. 9 is a partial cross-sectional view of a hydrostatic transmission incorporating a combination valve in accordance with the present invention.

The structure of the hydrostatic transmission, and in particular the flow path of the hydraulic fluid is shown in more detail in FIG. 9. The general operation of hydrostatic transmissions is known and is described in the above-referenced U.S. Pat. No. 5,201,692, and will not be described in detail here. In general, it is known that the input shaft causes the rotation of the pump, and the movement of a plurality of pump pistons against a swash plate causes hydraulic fluid to flow through hydraulic passages to the motor and a plurality of motor pistons which abut another swash plate. As shown in FIG. 9, the hydraulic fluid may also be diverted to flow through valve 10, to exit from the system to the case as described herein.

A hydraulic circuit is located within center section 50 and incorporates elements in addition to those shown in FIG. 9, including the internal portions of pump 57 and a motor (not shown) and pump pistons 59 and motor pistons (not shown) and the porting in center section 50 between the pump and motor.

Figure 6:
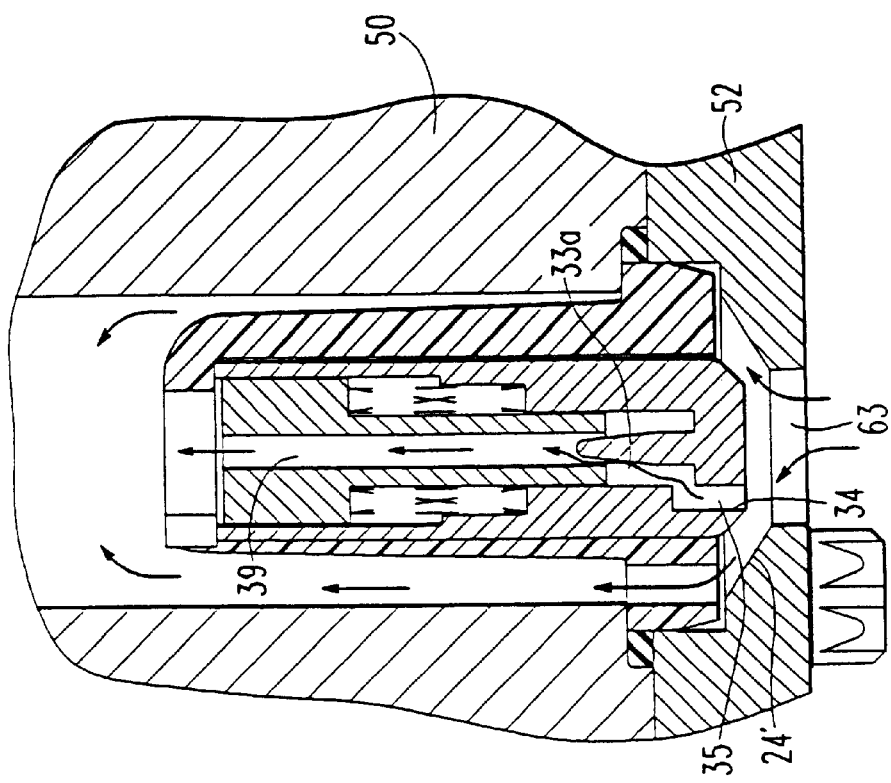
FIG. 6 is a partial cross-sectional view of the HST and valve shown in FIG. 2, with the check valve in the fully open position and the neutral valve in the fully open position.

A benefit of this invention is in the combination of check valve functions and neutral valve functions in a single valve. As shown in FIG. 6, when the hydraulic circuit is under "vacuum," or a very low pressure with respect to that of the pressure side of the circuit, the check spool 32 is lifted off of seat 24, and the fluid flows essentially in reverse of what has been previously described with respect to the neutral spool assembly and hydraulic fluid is pulled from the transmission housing or a sump into the hydraulic circuit through valve 10. Fluid may be drawn through filter element 58 before being drawn through check plate opening 63, opening 34 in check spool 32 to the internal passages 35, 33a and 39, and also between said retainer 16 and the center section 50. Then when the pressure in that portion of the hydraulic circuit adjacent to the valve reaches a certain pressure, check spool 32 is reseated on seat 24, and the valve is prepared to function as a neutral valve as described above. Specifically, in the embodiment illustrated, when the pressure is equal on both sides of the check spool 32, owing to gravity acting upon the check spool, the check spool with reseat. In an alternate embodiment, not shown, the valve could be positioned such that gravity will maintain the valve unseated when the pressure upon both sides of the check spool 32 are equal.

From the previous descriptions it is seen that an initial pressure, or pressure equalization, will first cause the check spool 32 to seat against seat 24.

Thereafter, an increase in pressure will start to close the neutral spool against the pressure of the fluid trapped within chamber 33b and/or the bias of spring 40. A decrease in pressure will either unseat the check spool 32 at which time the bias of the spring 40 will open the neutral spool 38 or only be sufficient enough to allow the spring 40 to open the neutral spool 38 while the check spool 32 remains seated.

A prior art version of a check valve is shown in FIGS. 7 and 8 with FIG. 7 showing the check valve in the fully closed position and FIG. 8 showing the check valve in the fully open position. The reference numerals for similar elements are the same as those used in other figures. As can be seen, valve 82 can be mounted in center section 50 and secured therein by check plate 52. Popper 81 is mounted inside valve 82 and the flow of oil through the body of valve 82 is controlled by spring 83. The oil flow in such a design will be essentially fully open or fully closed, and this design does not provide for any neutral valve function.

Figure 10:
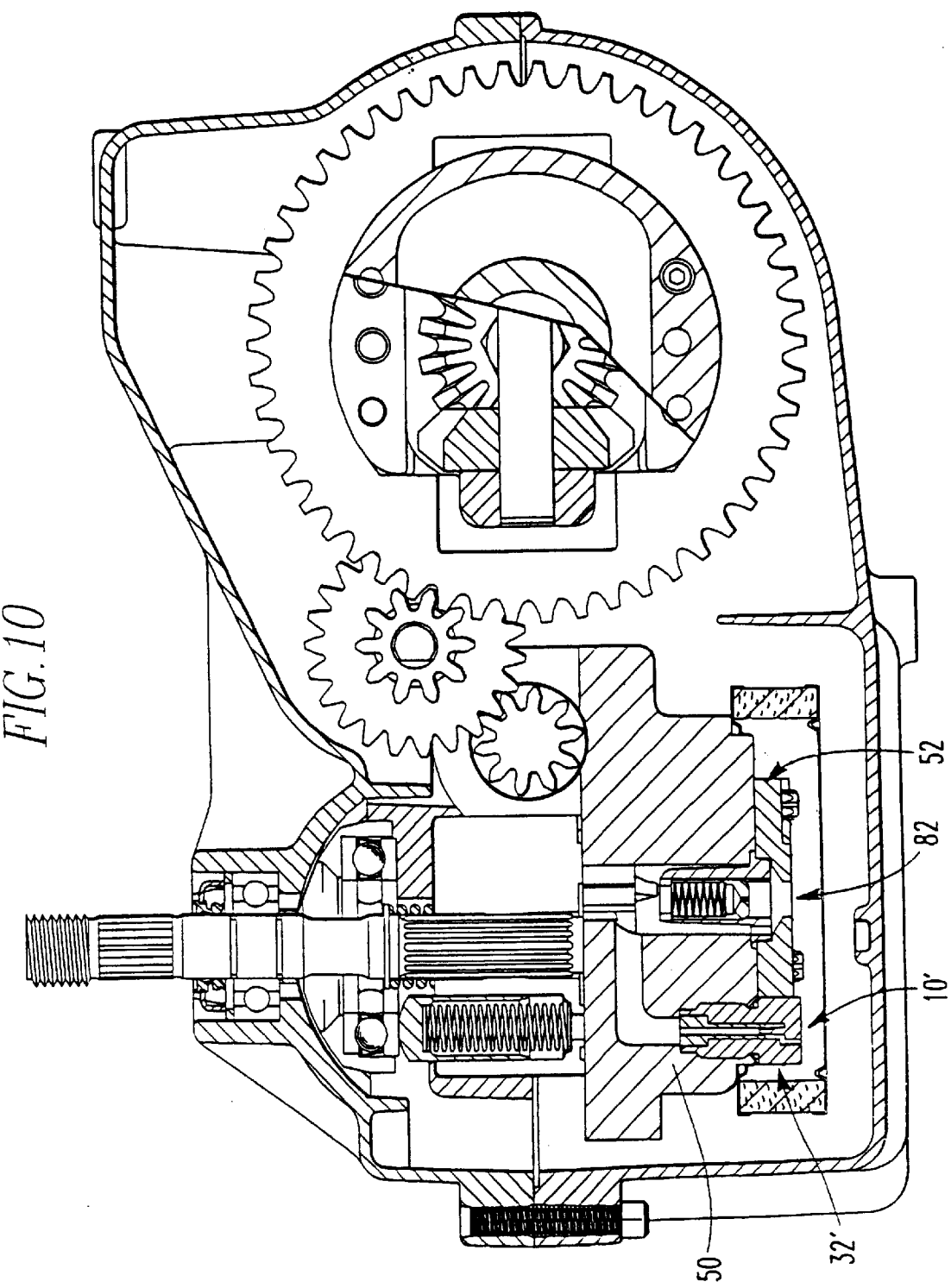
FIG. 10 is a partial cross-sectional view of a HST incorporating a separate check valve and neutral valve in accordance with the present invention.
Figure 11:
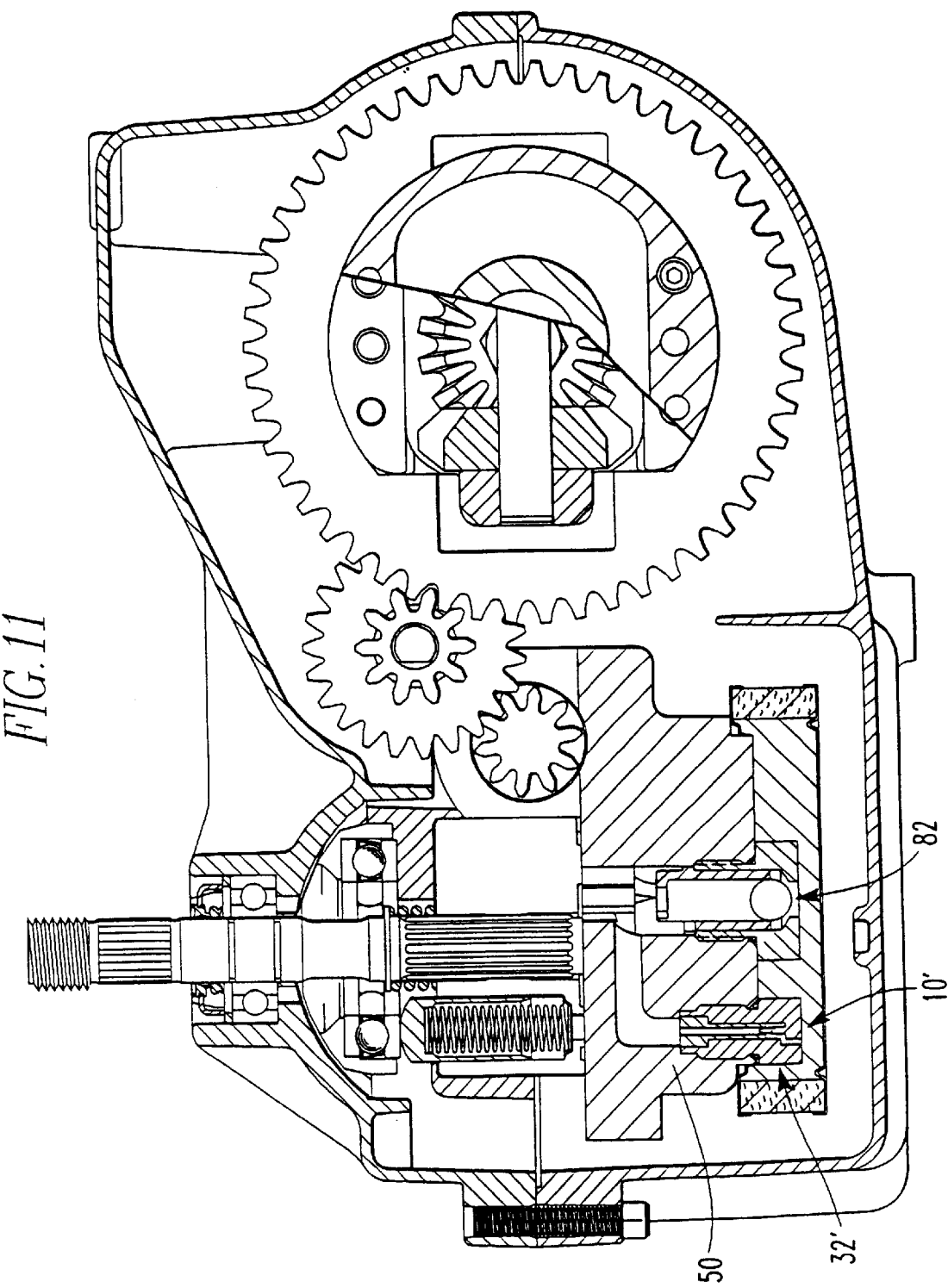
FIG. 11 is a partial cross-sectional view of a HST similar to that shown in FIG. 10 in which a different form of check valve is utilized.
Figure 12:
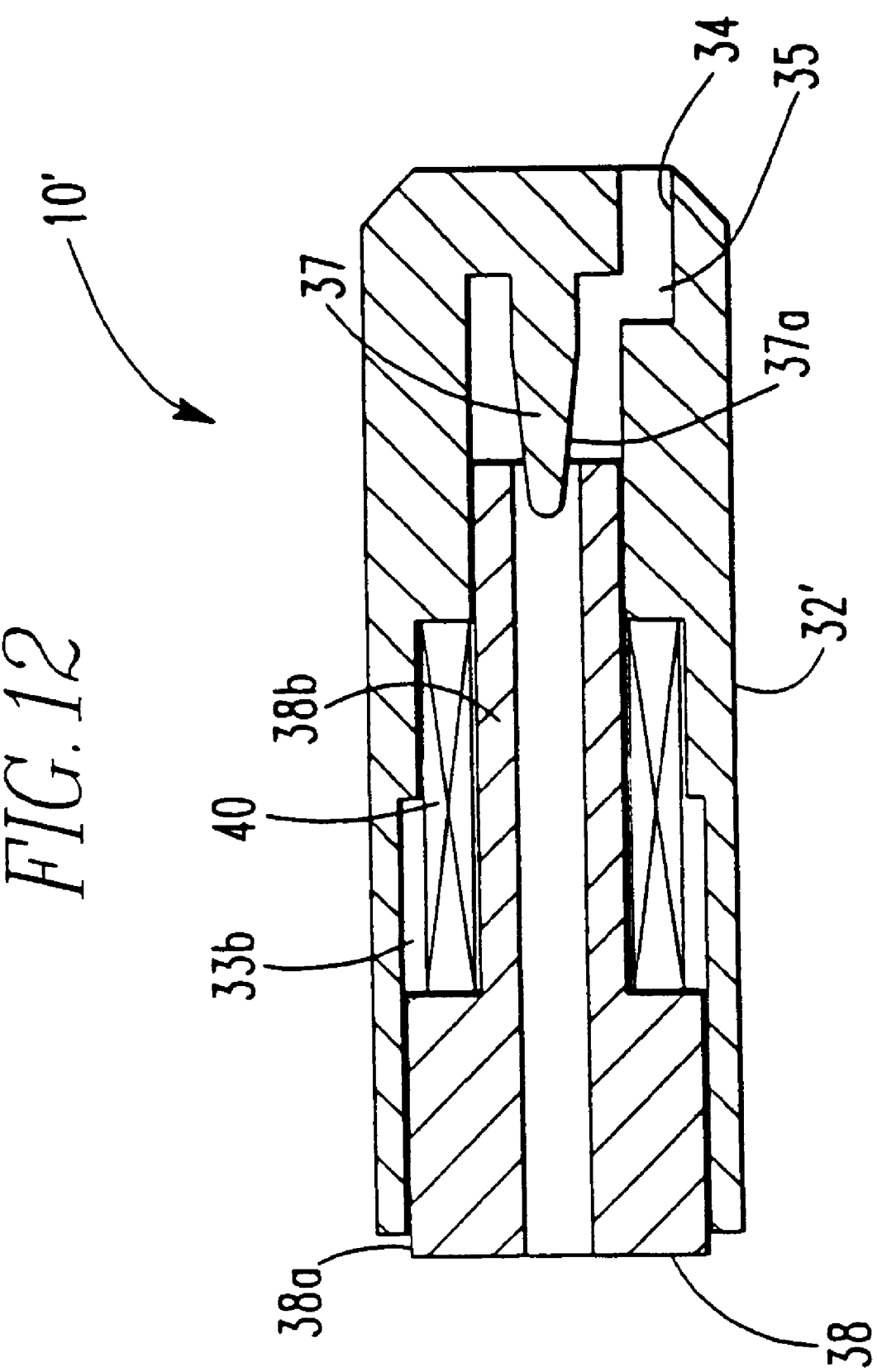
FIG. 12 is a partial cross-sectional view of the neutral valve portion of the combination valve which is illustrative of the neutral valve used in conjunction with the embodiments shown in FIGS. 10 and 11.

It will also be appreciated by those skilled in the art that improved neutral valve described herein may be used in conjunction with the prior art check valves described above. Illustrated in FIGS. 10–12 is a neutral valve assembly 10' which does not include the freely movable check valve spool 32 but instead uses a plug 32' which is fixedly mounted to the center section 50 whereby only the neutral spool 38 is free to move therein. The operation and movement of the neutral spool 38 is as described hereinbefore with respect to the combination valve 10. The operations and configuration of this type of hydraulic system utilizing a separate check and neutral valves will be appreciated by those skilled in the art and need not be described herein.

It should be apparent from the preceding description that this invention has among other advantages, the advantage of providing a single valve which is capable of allowing make-up flow into the hydraulic system, stopping neutral flow from the hydraulic system, and cushioning the acceleration and deceleration of the vehicle.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any 'equivalent thereof

The invention claimed is:

1. A method of making a hydrostatic transmission having controlled fluid pressure, the method comprising the steps of:

hydraulically linking a hydraulic pump and a hydraulic motor, forming a hydraulic circuit; and fluidly connecting the hydraulic circuit to a sump through a valve comprising a neutral spool and a check spool, wherein the neutral spool is movable relative to the check spool to control fluid pressure in the hydrostatic transmission.

2. The method of claim 1, comprising the step of using a means to control movement of the neutral spool relative to the check spool based upon the fluid flow through the valve.

3. The method of claim 1, wherein the step of using a means to control movement of the neutral spool relative to the check spool comprises the step of basing control upon the rate of fluid flow through the valve.

4. The method of claim 1, wherein the hydrostatic transmission comprises a center section disposed between the hydraulic pump and hydraulic motor, and the method comprises fixedly mounting the check spool to the center section.

* * * * *